United States Patent
Riera et al.

(10) Patent No.: US 12,540,555 B2
(45) Date of Patent: Feb. 3, 2026

(54) STATOR PART HAVING A FIN, IN A TURBINE ENGINE

(71) Applicants: SAFRAN, Paris (FR); CENTRE NATIONAL DE LA RECHERCHE SCIENTIFIQUE (CNRS), Paris (FR)

(72) Inventors: William Henri Joseph Riera, Moissy-Cramayel (FR); Gabriel Jacques Victor Mondin, Moissy-Cramayel (FR); Xavier Jean-Pierre Ottavy, Boulogne-Billancourt (FR)

(73) Assignees: SAFRAN, Paris (FR); CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 0 days.

(21) Appl. No.: 18/855,869

(22) PCT Filed: Apr. 7, 2023

(86) PCT No.: PCT/FR2023/050506
§ 371 (c)(1),
(2) Date: Oct. 10, 2024

(87) PCT Pub. No.: WO2023/198980
PCT Pub. Date: Oct. 19, 2023

(65) Prior Publication Data
US 2025/0305421 A1 Oct. 2, 2025

(30) Foreign Application Priority Data
Apr. 11, 2022 (FR) .................................. 2203297

(51) Int. Cl.
*F01D 9/04* (2006.01)
*B64D 27/10* (2006.01)
*F01D 5/14* (2006.01)

(52) U.S. Cl.
CPC ............. *F01D 9/041* (2013.01); *B64D 27/10* (2013.01); *F01D 5/141* (2013.01); *F05D 2220/323* (2013.01)

(58) Field of Classification Search
CPC .......... F01D 9/041; F01D 5/141; B64D 27/10
See application file for complete search history.

(56) References Cited

U.S. PATENT DOCUMENTS 9,874,221 B2 * 1/2018 Dipietro, Jr. .......... F04D 29/324
12,281,599 B2 * 4/2025 Mondin .................. F01D 5/146
(Continued)

FOREIGN PATENT DOCUMENTS

| CN | 112177684 A | * | 1/2021 | ............. F01D 5/187 |
| CN | 119183495 A | * | 12/2024 | ........... F04D 29/681 |

(Continued)

OTHER PUBLICATIONS

French Preliminary Search Report for French Application No. FR 2203297, dated Nov. 24, 2022.
(Continued)

*Primary Examiner* — Brian Christopher Delrue
(74) *Attorney, Agent, or Firm* — BIRCH, STEWART, KOLASCH & BIRCH, LLP (57) ABSTRACT

The invention relates to a stator part (20) comprising a platform (22), a first blade (24), a second blade (26), and a fin (28) having a leading edge (30) and a trailing edge (32), the fin extending opposite an upper surface (124) of the first blade and a lower surface (126) of the second blade, the leading edge comprising a leading point (34) located on the platform, a tangent to the leading edge at the leading point extending between the first blade and a radial leading plane (Pa) and the leading point, and the trailing edge comprising a trailing point (36) located on the platform, a tangent to the trailing edge at the trailing point extending between the (Continued)

second blade and a radial trailing plane (Pf) and the trailing point.

8 Claims, 3 Drawing Sheets

(56) References Cited

U.S. PATENT DOCUMENTS

| | | | | |
|---|---|---|---|---|
| 2016/0186773 | A1* | 6/2016 | Dipietro, Jr. | F04D 29/324 |
| | | | | 416/183 |
| 2017/0022835 | A1* | 1/2017 | Clark | F01D 9/06 |
| 2018/0017079 | A1* | 1/2018 | Dipietro, Jr. | F04D 25/045 |
| 2018/0156124 | A1* | 6/2018 | Clements | F04D 29/542 |
| 2018/0252113 | A1* | 9/2018 | Northall | F01D 5/142 |
| 2018/0252231 | A1* | 9/2018 | Northall | F02C 3/06 |
| 2024/0218802 | A1* | 7/2024 | Mondin | F01D 9/041 |

FOREIGN PATENT DOCUMENTS

| | | | | | |
|---|---|---|---|---|---|
| CN | 119213199 | A | * | 12/2024 | ........... F04D 29/681 |
| EP | 0978632 | A1 | * | 2/2000 | ............ F01D 5/145 |
| EP | 3608505 | A1 | * | 2/2020 | ............ F01D 9/041 |
| EP | 3608505 | B1 | * | 6/2021 | ............ F01D 9/041 |
| FR | 3 014 943 | A1 | | 6/2015 | |
| FR | 3134415 | A1 | * | 10/2023 | ............ F01D 9/041 |
| WO | WO 2019/220042 | A1 | | 11/2019 | |
| WO | WO 2021/123098 | A1 | | 6/2021 | |
| WO | WO-2023198981 | A1 | * | 10/2023 | ............ F01D 9/041 |

OTHER PUBLICATIONS

International Search Report with English translation and Written Opinion of the International Searching Authority for International Application No. PCT/FR2023/050506, dated Jun. 7, 2023.

* cited by examiner

STATOR PART HAVING A FIN, IN A TURBINE ENGINE

FIELD OF THE INVENTION

The invention relates to stator parts of a turbine engine comprising a blade such as a flow straightener located downstream of a compressor, and in particular a fixed-pitch straightener.

PRIOR ART

In an aircraft turbine engine, and in particular aircraft intended for the transport of passengers, it is the air propelled by a fan and combustion gases leaving the turbine engine through an exhaust nozzle which exert a reaction thrust on the turbine engine and, through it, on the aircraft. The circulation of the gases through the turbine engine is influenced by blading in rotation and fixed blading. The fixed or stator blading include in particular outlet guide vanes (or OGV), inlet guide vanes (or IGV) and variable stator vanes (or VSV). The straightener blades of an aeronautical gas turbine engine can each have two platforms (inner and outer) which are applied to the blading. There also exist unshrouded architectures comprising straightener blades which have only a single, inner platform. In any case, these straightener blades form rows of fixed blades which allow guiding the gas flow passing through the engine at an appropriate speed and angle.

Within a flow straightener comprising a plurality of fixed blades, the overall flow of the gases occurs between the blades in an upstream-downstream direction. It is known, however, that the zone of the blade root can be the site of secondary aerodynamic flows.

For each pair of blades facing one another, a pressure gradient between the pressure face (lower side) of the first blade and the suction face (upper side) of the second blade generates a crossflow which transports the gases toward the upper side.

At the end of the blade, i.e. at the junction between the blading and the hub or between the blading and the casing, a corner separation and a corner vortex can occur. This separation generates pressure loses as well as an aerodynamic blockage. The latter is problematic in terms of operability. For high angles of attack of the flow arriving on the straightener, i.e. when the direction of flow of the gases upstream of the straightener forms a large angle with a direction of the leading edge of the blade, this corner separation is amplified until it causes a separation of the boundary layer on the blade which can no longer provide deflection of the flow.

There is therefore a need for a new geometry allowing correcting these problems and improving the performance in terms of efficiency of the equipment, particularly at high angles of attack of the flow entering into the straightener.

DISCLOSURE OF THE INVENTION

One object of the invention is to propose a stator part of a turbine engine, the geometry of which improves the flow of fluids relative to the prior art.

The object is attained within the scope of the present invention by means of a stator part comprising:
a platform defining a wall of a gas flow stream,
a first blade,
a second blade, and
a fin comprising a leading edge and a trailing edge,
the fin extending into the stream radially relative to an axis of the turbine engine from the platform, facing an upper side of the first blade and a lower side of the second blade
the leading edge comprising a leading point located on the platform, a tangent to the leading edge at the leading point extending into the stream from the platform between the first blade and a radial leading plane passing through the axis and the leading point,
the trailing edge comprising a trailing point located on the platform, a tangent to the trailing edge at the trailing point extending into the stream from the platform between the second blade and a radial trailing plane passing through the axis and the trailing point.

A stator part of this type is advantageously and optionally completed by the following different features, taken alone or in combination:
the platform is a first platform, the part comprising a second platform so as to define the flow stream between the first platform and the second platform, the stream extending radially over a stream height, the fin extending radially over a fin height, a ratio of the fin height to the stream height being greater than or equal to 0.01 and less than or equal to 0.4;
the first blade and the second blade are angularly separated in a circumferential direction by an angular pitch, an angular separation of the first blade and the fin in the circumferential direction being less than or equal to six-tenths of the angular pitch;
the first blade comprises a leading edge and a trailing edge separated by a blade chord, the fin comprising a plurality of profiles stacked in a radial direction between a fin root located on the platform and a fin tip, each profile defining a chord between the leading edge of the fin and the trailing edge of the fin, and a maximum thickness of the profile between a lower side of the fin and an upper side of the fin in a direction perpendicular to a chord line, a ratio of a difference between the tip profile chord and the root profile chord to the blade chord being less than or equal in absolute value to 0.05; a ratio of the maximum thickness of the root profile to the root profile chord is less than or equal to 0.05; and a ratio of the maximum thickness of the tip profile to the root profile chord is less than or equal to 0.05;
the first blade comprises a leading edge and a trailing edge separated by a blade chord, the fin comprising a plurality of profiles stacked in a radial direction between a fin root and a fin tip, each profile defining a fin chord between the leading edge and the trailing edge, a ratio of the fin root chord to the blade chord being greater than or equal to 0.2 and less than or equal to 1.1; a first oriented angle being defined from the axis to a first tangent to the camber line to the fin root profile at the leading point, a second oriented angle being defined from the axis to a second tangent to the camber line of the root profile of the first blade at a reference point of the camber line of the root profile of the first blade, the reference point having an axial position of the leading point, a difference between the first oriented angle and the second oriented angle being greater than or equal to −50 degrees and less than or equal to +10 degrees, the fin defining an axial coordinate of a mid-chord point of a fin profile, the mid-chord point being located at equal distance from the leading edge of the fin and from the trailing edge of the fin, the axial coordinate being greater than or equal to an axial position of the leading edge of the first blade and less than or equal to a sum of the axial position of the leading edge of the first blade and of the blade chord;

the first blade comprises a leading edge and a trailing edge separated by a blade chord, the fin comprising a plurality of profiles stacked in a radial direction between a fin root and a fin tip, each profile defining a camber line and a chord between the leading edge of the fin and the trailing edge of the fin, a ratio of the fin root profile chord to the blade chord being greater than or equal to 0.1 and less than or equal to 0.4; an angle between a first tangent to the camber line of the fin root profile at the leading point and a second tangent to the camber line of the root profile of the first blade at a reference point of the camber line of the root profile of the first blade, the reference point having an axial position of the leading point, being less than or equal in absolute value to 10 degrees, the fin defining an axial coordinate of a mid-chord point of a fin profile, the mid-chord point being located at equal distance from the leading edge of the fin and from the trailing edge of the fin, the axial coordinate being greater than or equal to a difference of an axial position of the leading edge of the first blade and of one-tenth of the blade chord, and less than or equal to a sum of the axial position of the leading edge of the first blade and of half the blade chord;

The invention also relates to a turbine engine comprising a stator part as was just presented and on an aircraft comprising a turbine engine of this type.

DESCRIPTION OF THE FIGURES

Other features and advantage of the invention will also be revealed by the description that follows, which is purely illustrative and not limiting, and must be read with reference to the appended drawings in which.

DETAILED DESCRIPTION OF THE INVENTION

Turbine Engine

Figure 1:
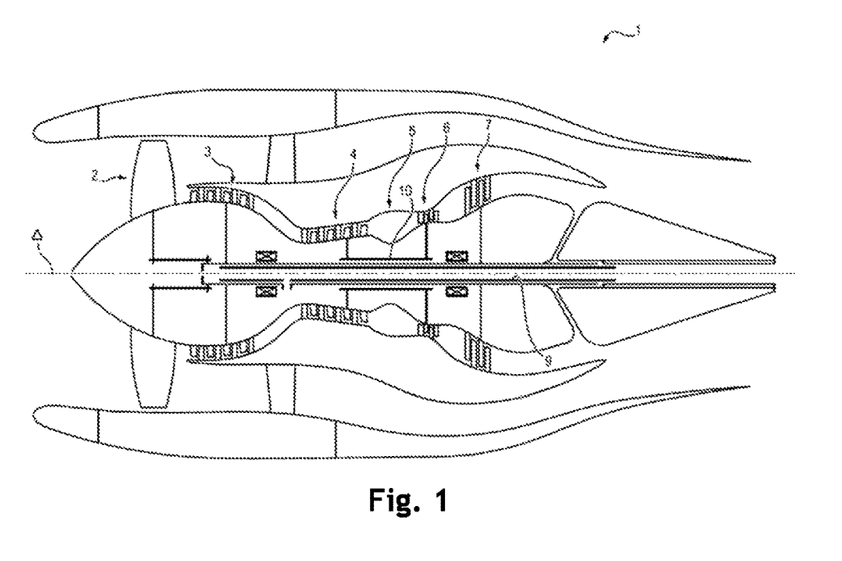
FIG. 1 is a schematic representation of a turbine engine.

Referring to FIG. 1, a turbine engine is shown schematically, more specifically a dual flow axial turbojet 1. The illustrated turbojet 1 extends along an axis Δ and includes successively, in the direction of flow of the gases in the turbine engine, a fan 2, a compression section which can comprise a low-pressure compressor 3 and a high-pressure compressor 4, a combustion chamber 5, and a turbine section which can comprise a high-pressure turbine 6, a low-pressure turbine 7 and an exhaust nozzle.

The fan 2 and the low-pressure compressor 3 are driven in rotation by the low-pressure turbine 7 by means of a first transmission shaft 9, while the high-pressure compressor 4 is driven in rotation by the high-pressure turbine 6 by means of a second transmission shaft 10.

During operation, a flow of air compressed by the low- and high-pressure compressors 3 and 4 supports combustion in a combustion chamber 5, the expansion of the combustion gases from which drives the high- and low-pressure turbines 6, 7. The air propelled by the fan 2 and the combustion gases leaving the turbojet 1 through an exhaust nozzle downstream of the turbines 6, 7 exert a reaction thrust on the turbojet 1 and, through it, on a vehicle or machine such as an aircraft (not illustrated).

Stator Part

Downstream of the fan or of a compression stage, the turbine engine can comprise a stage of straightening blades. A straightening blade stage of this type can comprise a stator part 20 as shown with reference to FIG. 2.

Figure 2:
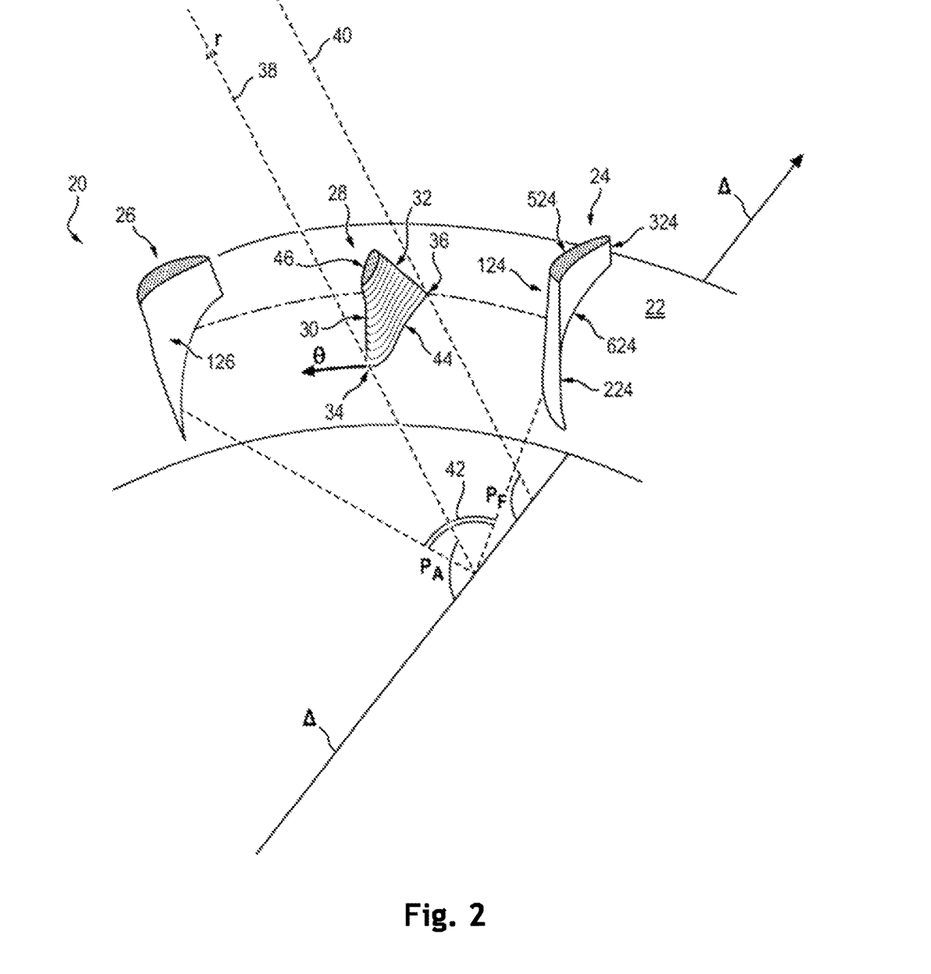
FIG. 2 is a schematic representation of a stator part according to a first embodiment.

The stator part 20, or the assembly 20 of stator parts if it is not a single-piece design, has at least two adjacent blades 24, 26 and a platform 22 from which the blades 24, 26 extend.

Here the term "platform" designates any element of the turbine engine from which blades 24, 26 are able to be mounted. The platform can in particular be a hub or a casing which surrounds the axis of the turbine engine. The platform can have a cylindrical surface with a constant radial distance from the axis Δ of the turbine engine. The platform 22 has an inner wall or an outer wall against which the air circulates, i.e. the platform 22 defines a wall of a gas flow stream. The blades 24, 26 extend from the platform 22 into the stream, either radially outward while separating themselves from the axis of the turbine engine Δ or radially inward while approaching the axis of the turbine engine Δ.

FIG. 2 is a schematic representation of the stator part 20 in perspective. The axis Δ of the turbine engine is shown there oriented positively in the direction of the flow of the gases in the turbine engine. FIG. 2 also shows a radial axis r and a circumferential axis θ passing through a point 34 of the platform 22. At each point in space, and for example at a point 34 of the platform 22, a radial axis r can be defined which is perpendicular to the axis Δ of the turbine engine and which passes through the point and the axis Δ of the turbine engine. The radial axis is oriented positively in the direction which separates it from the axis Δ of the turbine engine. It is also possible to define a circumferential axis θ which passes through the point and which is perpendicular to the radial axis r and to the axis Δ of the turbine engine. The circumferential axis is oriented positively in the direction that separates it from the axis Δ of the turbine engine.

In the example of FIG. 2, the blades 24, 26 extend radially from the platform 22 while separating themselves from the axis of the turbine engine, but the invention is not limited to only this situation.

Figure 3:
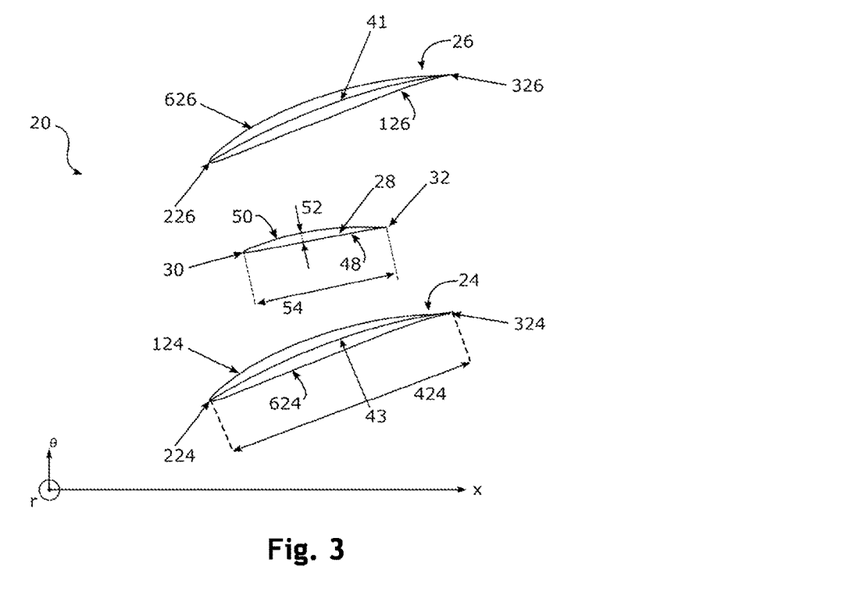
FIGS. 3 and 4 are schematic section views, in a plane perpendicular to a radial axis of the turbine engine, of a stator part according to the first embodiment.

FIG. 3 is a schematic representation of the stator part 20 in a circumferential plane passing through the platform 22, a circumferential plane which is at a constant distance from the axis Δ of the turbine engine.

Such a circumferential plane parallel to the axis Δ of the turbine engine allows defining a section of the blades 24, 26.

The direction of the axis Δ is given in FIG. 3 by the axis x, the orientation of which is the direction of flow of the gases. The radial axis r is perpendicular to the plane of FIG. 3 and directed toward the reader of FIG. 3. The axis θ corresponds to the circumferential direction, which is perpendicular simultaneously to the axis Δ and to the radial axis.

Each of the blades 24 and 26 has a lower side 624, 126 and an upper side 124, 626.

Each of the blades 24 and 26 comprises a leading edge 224, 226 on the upstream side and a trailing edge 324, 326 on the downstream side. The terms upstream and downstream are defined in relation to the general flow of the gases through the turbine engine, which occurs from upstream to downstream in the direction and the orientation of the axis Δ of the turbine engine.

The blades define a blade chord 424 which is the length of the segment connecting the leading edge and the trailing edge in a circumferential plane with a constant radius or at a constant distance from the axis Δ, a circumferential plane which can be qualified as a section plane.

Likewise, in a circumferential section plane, each blade has a camber line 43, 41 which is the curve equal to the mean of the upper side curve and the lower side curve. More precisely, the camber line is formed from all the points located at equal distance from the upper side and from the lower side. Here the distance from a particular point to the upper side (or from the lower side) is defined as the minimum distance between the particular point and a point of the upper side (or of the lower side).

Fin

The stator part 20 also comprises a fin 28 which extends from the platform 22 in the same direction and in the same extension orientation as the blades 24, 26. The fin 28 extends into the stream radially relative to the axis Δ of the turbine engine from the platform 22.

The fin 28 is located between the blades 24 and 26. More precisely, the fin 28 is located facing the upper side 124 of the first blade 24 and the lower side 126 of the second blade 26.

The fin 28 comprises a lower side 48 which faces the upper side 124 of the first blade and an upper side 50 which faces the lower side 126 of the second blade 26.

The fin 28 comprises a leading edge 30 and a trailing edge 32, the leading edge 30 being located upstream of the trailing edge 32.

The leading edge 30 comprises a leading point 34 located on the platform 22. The leading point 34 corresponds to the intersection of the leading edge 30 and the platform 22. A radial leading plane Pa is defined which passes through the axis Δ of the turbine engine and the leading point 34.

Any radial plane comprises the axis Δ of the turbine engine.

The trailing edge 32 comprises a trailing point 36 located on the platform 22. The trailing point 36 corresponds to the intersection of the trailing edge 32 and the platform 22. A radial trailing plane Pf is defined which passes through the trailing point 36 and which comprises the axis Δ of the turbine engine.

The most general embodiment of the invention corresponds to the following two features.

The fin 28 has a tangent to the leading edge 30 at the leading point 34 which extends into the stream from the platform 22 between the first blade 24 and the radial leading plane Pa. In other words, in a radial plane orthogonal to the axis Δ of the turbine engine and passing through the leading point, the tangent to the leading edge while separating itself from the platform 22 on the stream side of the platform approaches the first blade 24. Formulated in yet a different manner, the leading edge 30 is inclined at the leading point 34 toward the first blade 24. It should be noted that, moreover, this tangent to the leading edge can have a nonzero projection on the axis Δ of the turbine engine.

The fin 28 has a tangent to the trailing edge 32 at the trailing point 36 which extends into the stream from the platform 22 between the second blade 26 and the radial trailing plane Pf. In other words, in a radial plane orthogonal to the axis Δ of the turbine engine and passing through the trailing point, the tangent to the trailing edge while separating itself from the platform 22 on the stream side of the platform approaches the second blade 26. Formulated in yet a different manner, the trailing edge 32 is inclined at the trailing point 36 toward the second blade 26. It should be noted that, moreover, this tangent to the trailing edge can have a nonzero projection onto the axis Δ of the turbine engine.

The inclination toward the first blade on the leading edge side allows producing a kinking effect at the leading edge which channels the crossflow better.

The inclination toward the second blade on the tailing edge side allows a lean effect at the trailing edge which blocks the crossflow more effectively. This allows avoiding that the crossflow originating from the second blade 26 goes up the upper side of the fin 28 and passes beyond the fin to join the lower side of the first blade 24. The fin is therefore "laid down" on the trailing edge side so as to have a wall inclined toward the upper side of the second blade 26. This is the positive lean effect. The crossflow is then strongly driven back toward the lower side of the second blade 26.

The particular form of fin presented here, which allows improving the operability of the compressor straighteners by blocking the crossflow, which limits the development of the corner separation. This has the effect of limiting the losses and the blockage associated with the phenomenon of corner separation, which improves the stability of the straightener, particularly when it is subjected to high angles of attack. The specificity of the fins obtained rests on the channeling of the crossflow, as well as on a positive lean effect which improves the manner in which the crossflow is driven back.

It should be noted that the fin can have a leading edge 30 which is straight, and therefore conflated with the tangent to the leading edge 30 at the leading point 34.

It should be noted that the fin can have a trailing edge 32 which is straight, and therefore conflated with the tangent to the trailing edge 32 at the trailing point 34.

Fin Height

The platform 22, as described up to the present, defines an inner radial wall or respectively an outer radial wall of the gas flow stream.

When the stator part 20 corresponds to a shrouded structure, it comprises a second platform located radially facing the first platform 22, this second platform defining the radial outer wall or respectively the radial inner wall of the gas flow stream. The gas flow stream then passes radially between the first platform 22 and the second platform, the stream extending radially over a certain stream height.

When the stator part 20 corresponds to an unshrouded architecture, it comprises only a single platform 22 defining the inner radial wall of the gas flow stream. The stream extends radially over a certain stream height defined by the height of the blades of the stator part 20, blades that protrude radially outward from the platform 22.

The fin 28 extends radially over a fin height.

According to a first optional variant of the most general embodiment, a ratio of the fin height to the stream height being greater than or equal to 0.01 and less than or equal to 0.4.

Circumferential Fin-First Blade Distance

The first blade 24 and the second blade 26 are separated in a circumferential direction by a pitch 42. The pitch 42 which separates the blades is an angle separating a radial direction of the first blade 24 and a radial direction of the second blade 26. The pitch is fixed by the total number of blades playing the same role and having the same axial position as the blades 24 and 26, and which are located all around the axis Δ of the turbine engine. The distance separating the first blade 24 and the second blade 26 is given by this angle and the radius to the axis Δ at which it is desired to evaluate this distance.

It is also possible to define an angle separating the first blade 24 and the fin 28 in the circumferential direction, or an angle separating a radial direction of the first blade 24 and a radial direction of the fin 28.

According to a second optional variant of the most general embodiment and of its first variant, the angular separation of the first blade 24 and of the fin 28 in the selected circumferential direction is selected less than or equal to six-tenths of the angular pitch 42.

Fin Profiles

As previously seen, the first blade 24 defines a blade chord 424 between its leading edge 224 and its trailing edge 324.

It is possible to model or represent the fin 28 as a stack of profiles in a radial direction between a fin root 44 and a fin tip 46. The fin root 44 is located on the platform 22 and corresponds to the intersection of the fin 28 and the platform 22. The fin tip is located at a distance from the platform 22 in the gas flow stream. Each fin profile extends in a circumferential plane parallel to the axis Δ of the turbine engine, like a section of the fin produced in this circumferential plane with a constant radius or constant distance from the axis Δ, a circumferential plane which can be qualified as a section plane.

Figure 4:
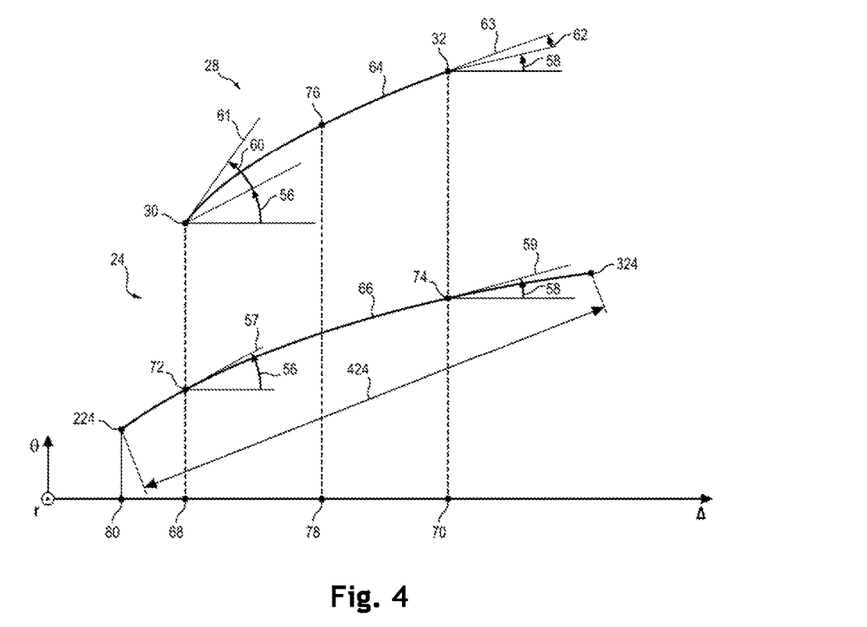

FIG. 4 is a schematic representation in a circumferential plane of certain parameters of the fin profile.

With reference to FIGS. 3 and 4, each fin profile defines a fin chord 54 between the leading edge 30 of the fin and the trailing edge 32 of the fin. More precisely, the fin chord 54 is defined between, on the one hand, a first point at the intersection of the leading edge 30 and of the section plane, and on the other hand a second point at the intersection of the trailing edge 32 and the section plane. The fin chord designates the length of the segment connecting the first point and the second point. The chord line designates the segment connecting the first point and the second.

Each fin profile also defines a maximum thickness 52 between the lower side 48 of the fin and the upper side 50 of the fin in a direction perpendicular to the chord line.

Each fin profile allows defining a camber line 64 which is the curve equal to the mean of the curve of the upper side 50 of the fin and the curve of the lower side 48 of the fin. More precisely, in a given profile of the fin, the camber line 64 is formed of all the points located at equal distance between, on the one hand, the intersection of the upper side 50 and the section plane and, on the other hand, the intersection of the lower side 48 and the section plane. The camber line of the fin can be selected close to the camber line of the first blade 24.

The fin has a continuous variation of the profiles in the radial direction, i.e. all the parameters of camber, chord, and thickness vary continuously from the root profile to the tip profile.

A third optional variant of the most general embodiment and of its first and second optional variants comprises the following three features:
  a ratio of the fin root profile chord to the blade chord 424 is greater than or equal to 0.2 and less than or equal to 1.1;
  a ratio of the maximum thickness of the root profile to the root profile chord is less than or equal to 0.05; and
  a ratio of the maximum thickness of the tip profile to the root profile chord is less than or equal to 0.05.

"Metal" Angles of the Fin and of the First Blade

It is possible to define, for the first blade 24 and the second blade 26:
  a metal blade leading angle as the angle between the tangent at the camber line to the leading edge of the blade and the axis Δ of the turbine engine, the angle being oriented from the axis Δ toward the tangent, and
  a metal blade trailing angle as the angle between the tangent to the camber line at the trailing edge of the blade and the axis Δ, the angle being oriented from the axis Δ to the tangent.

For each fin profile, it is possible to define, with reference to FIG. 4:
  a metal fin leading angle as the angle between the tangent 61 to the camber line at the leading edge of the fin and the axis Δ of the turbine engine, the angle being oriented from the axis Δ toward the tangent 61, and
  a metal fin trailing angle as the angle between the tangent 63 to the camber line at the trailing edge of the fin and the axis Δ, the angle being oriented from the axis Δ to the tangent 63.

In the particular case of the fins described in this invention, it is possible to choose to estimate the metal angles as a function of the local camber angle of the blade 24 or 26.

For this purpose, and in relation with FIG. 4, it is possible to associate, with each point of each camber line 64 of each fin profile, an axial position and a radial position. The fin point is associated with a reference point of a camber line 66 of a profile of the first blade 24, the reference point having the axial position and the radial position of the fin point.

This fin point can for example be located at the leading edge 30 at the axial position 68: the associated reference point is labeled 72 in FIG. 4.

This fin point can for example be located at the trailing edge 32 at the axial position 70: the associated reference point is labeled 74 in FIG. 4.

It is possible to associate, with the metal fin leading angle, the local camber angle 56 which is the angle oriented from the axis Δ to the tangent 57 to the camber line 66 of the profile of the first blade 24 at the associated reference point 72. It is possible to describe the metal fin leading angle with reference to this local camber angle as the difference 60 between this metal angle and this local camber angle 56.

It is possible to associate, with the metal leading fin angle, the local camber angle 58 which is the angle oriented from the axis Δ to the tangent 59 to the camber line 66 of the profile of the first blade 24 at the associated reference point 74. It is possible to describe the metal fin trailing angle with reference to this local camber angle as the difference 62 between this metal angle and this local camber angle 58.

Generally, the fins described in this invention have, at the leading edge and at the trailing edge of the tip profile as well as at the trailing edge of the root profile, metal angles close to the local camber angle. More precisely:
  the angle 60 formed by a first tangent 61 to the camber line 64 of the fin tip profile at the leading edge 30 and by a second tangent 57 to the camber line 66 of the profile of the first blade at the reference point 72 associated with the leading edge of the fin tip profile is less than or equal in absolute value to 10 degrees;
  the angle 62 formed by a third tangent 63 to the camber line 64 of the fin tip profile at the trailing edge 32 and a fourth tangent 59 to the camber line 66 of the profile of the first blade at the reference point 74 associated with the trailing edge of the fin tip profile is less than or equal in absolute value to 10 degrees; and
  the angle formed by a fifth tangent to the camber line of the fin root profile at the trailing point 36 and a sixth tangent to the camber line of the first blade profile at the reference point associated with the trailing point 36 is less than or equal in absolute value to 10 degrees.

The tip profile and the root profile then have a metallic angle at the trailing edge, the value of which is close to the local camber of the blades. In this manner, the fin guides the flow at the trailing edge like the blades.

Axial Position of the Fin Relative to the First Blade

To characterize the position of the fin in the direction of the axis Δ of the turbine engine, an axial coordinate 78 of a mid-chord point 76 of a fin profile is used with reference to FIG. 4.

The mid-chord point 76 is located at equal distance from the leading edge 30 of the fin and from the trailing edge 32 of the fin.

In particular, it is possible to use the mid-chord point of the fin tip profile.

The fin root profile, for its part, is positioned axially relative to the tip profile due to the stacking law of the fin which gives the relative positioning of the fin tip profile relative to the fin root profile.

For this relative positioning, the mid-chord point is selected as the positioning reference of each profile of the stack. Two axes are defined:
  a first axis "t" directed in the chord direction of the root profile and oriented in the same direction as the axis Δ of the turbine engine from upstream to downstream;
  a second axis "n" perpendicular to the first axis "t" and oriented in the same direction as the circumferential axis θ of the first blade 24 toward the second blade 26.

Two angles are defined:
  a sweep angle which is the angle between the axis "t" and a direction defined by the mid-chord point of the root profile and the mid-chord point of the tip profile;
  a lean angle which is the angle between the axis "n" and the direction defined by the mid-chord point of the root profile and the mid-chord point of the tip profile.

In the particular case of the fins described here, the sweep and lean angles, as have just been defined, taken on values greater than or equal to −10 degrees and less than or equal to +10 degrees. These angles are sufficiently low that the axial position of the fin is considered well described by an axial coordinate 78 of a mid-chord point 76 of a fin profile.

"Long Fence" Embodiment

A second embodiment of the invention which is a particular case of the most general embodiment and of its variants comprises the following features:
  a ratio of the fin root profile chord to the blade chord 424 greater than or equal to 0.2 and less than or equal to 1.1;
  a difference between the metal fin leading angle at the fin root profile and the local camber angle of the root profile of the first blade is greater than or equal to −50 degrees and less than or equal to +10 degrees;
  an axial coordinate 78 of a mid-chord point 76 of a fin profile, the mid-chord point being located at equal distance from the leading edge 30 of the fin and from the trailing edge 32 of the fin, the axial coordinate 78 being greater than or equal to an axial position 80 of the leading edge 224 of the first blade and less than or equal to a sum of the axial position of the leading edge of the first blade and of the blade chord 424.

Regarding the metal fin angle of attack at the fin root profile, and as previously mentioned, this is a first oriented angle defined from the axis Δ to a first tangent to the camber line of the fin root profile at the leading point 34 of the leading edge 30. The local camber angle of the root profile of the first blade is a second oriented angle defined from the axis Δ to a second tangent to the camber line of the root profile of the first blade, at a reference point having an axial position of the leading point 34.

In this second embodiment, the fins are relatively long, which allows producing a physical effect of confining the crossflow between the upper side 50 of the fin 28 and the lower side 126 of the second blade 26.

The near-wall flow is strongly kinked, i.e. the flow has a gradient that increases as it separates from the platform. In fact, near the platform and farther from the platform, the gases do not flow in an identical manner. Near the platform it is the crossflow that dominates, so that the fluid flows mainly in the direction from the lower side of the second blade 26 to the upper side of the first blade 24; this crossflow is also slow, i.e. it corresponds to a small quantity of movement. Further from the platform, the flow occurs mainly from upstream to downstream while being guided by the blades, this flow being faster.

In this second mode, the fin has a leading edge of the fin with a metallic kinking. Thus, the metal angle of the fin root profile can be selected less than the metal angle of the fin tip, to be adapted to the slow gas flow near the platform, and the metal angle of the fin tip profile can be adapted to the tip flow in the sound flow region.

"Upstream Sharp" Embodiment

A third embodiment of the invention, which is a particular case of the most general embodiment and of its variants, comprises the following features:
  a ratio of the fin root profile chord to the blade chord 424 greater than or equal to 0.1 and less than or equal to 0.4;
  a difference between the metal fin leading angle on the fin root profile and the local camber angle of the root profile of the first blade is less than or equal in absolute value to +10 degrees;
  an axial coordinate 78 of a mid-chord point 76 of a fin profile, the mid-chord point 76 being located at equal distance from the leading edge 30 of the fin and from the trailing edge 32 of the fin, the axial coordinate 78 being greater than or equal to a difference between an axial position 80 of the leading edge 224 of the first blade 24 and one-tenth of the blade chord 424, and less than or equal to a sum of the axial position of the leading edge 80 of the first blade 24 and half the blade chord 424.

Regarding the metal fin leading angle on the fin root profile, and as previously mentioned, this is a first oriented angle defined from the axis Δ to a first tangent to the camber line of the fin root profile at the leading point 34 of the leading edge 30. The local camber angle of the root profile of the first blade is a second oriented angle defined from the axis Δ to a second tangent to the camber line of the root profile of the first blade, at a reference point having an axial position of the leading point 34.

In this third embodiment, the fins are relatively short and placed on the upstream part of an inter-blade channel defined between the blades. This will allow it to produce a corner vortex at the fin tip 28 which is able to energize the near-platform 22 flow. This allows straightening the crossflow and ultimately limiting corner separation.

It should be noted that a greater metal leading angle can also make the corner vortex more intense and favor the mixture and accelerate the flow on the upper side of the fin. The corner vortex will then mix the sound flow and the accelerated flow in the boundary layer of the hub.

The invention claimed is:

1. A stator part of a turbine engine, the stator part comprising:
   a platform defining a wall of a gas flow stream,
   a first blade
   a second blade, and
   a fin comprising a leading edge and a trailing edge,
   the fin extending from the platform into the gas flow stream radially relative to an axis of the turbine engine, the fin facing an upper side of the first blade and a lower side of the second blade,
   the leading edge comprising a leading point located on the platform, a radial leading plane passing through the axis and the leading point, a tangent to the leading edge at the leading point extending from the platform into the gas flow stream between the first blade and the radial leading plane,
   the trailing edge comprising a trailing point located on the platform, a radial trailing plane passing through the axis and the trailing point, a tangent to the trailing edge at the trailing point extending from the platform into the stream between the second blade and the radial trailing plane.

2. The stator part according to claim 1, wherein the platform is a first platform, the part comprising a second platform so as to define the gas flow stream between the first platform and the second platform, the gas flow stream extending radially over a stream height, the fin extending radially over a fin height, a ratio of the fin height to the stream height being greater than or equal to 0.01 and less than or equal to 0.4.

3. The stator part according to claim 1, wherein the first blade and the second blade are angularly separated in a circumferential direction relative to the axis by an angular pitch, an angular separation of the first blade and the fin in the circumferential direction being less than or equal to six-tenths of the angular pitch.

4. The stator part according to claim 1,
   wherein the first blade comprises a leading edge and a trailing edge separated by a blade chord,
   the fin comprising a plurality of profiles stacked in a radial direction between a root profile located at a fin root on the platform and a tip profile located at a fin tip,
   each profile defining a fin chord between the leading edge of the fin and the trailing edge of the fin,
   each profile defining a maximum thickness of the profile between a lower side of the fin and an upper side of the fin in a direction perpendicular to the chord of the profile,
   a ratio of a difference between a fin chord of the tip profile and a fin chord of the root profile to the blade chord being less than or equal in absolute value to 0.05;
   a ratio of a maximum thickness of the root profile to the chord of the root profile being less than or equal to 0.05; and
   a ratio of a maximum thickness of the tip profile to the chord of the root profile being less than or equal to 0.05.

5. The stator part according to claim 1,
   wherein the first blade comprises a leading edge and a trailing edge separated by a blade chord,
   the fin comprising a plurality of profiles stacked in a radial direction between a root profile located at a fin root on the platform and a tip profile located at a fin tip,
   each profile defining a fin chord between the leading edge of the fin and the trailing edge of the fin,
   each profile defining a fin camber line,
   a ratio of a fin chord of the root profile to the blade chord being greater than or equal to 0.2 and less than or equal to 1.1,
   a first oriented angle being defined between the axis and a first tangent to the fin camber line of the root profile, the first oriented angle being oriented from the axis to the first tangent, the first tangent being tangent to the fin camber line of the root profile at the leading point,
   a second oriented angle being defined between the axis and a second tangent to a blade camber line of a blade root profile of the first blade, the blade root profile being located on the platform, the first oriented angle being oriented from the axis to the second tangent, the second tangent being tangent to the blade camber line at a reference point, the reference point and the leading point having a same axial position with respect to the axis,
   a difference between the first oriented angle and the second oriented angle being greater than or equal to −50 degrees and less than or equal to +10 degrees,
   the fin defining an axial coordinate of a mid-chord point of a fin profile, the mid-chord point being located at equal distance from the leading edge of the fin and from the trailing edge of the fin,
   the axial coordinate of the mid-chord point being greater than or equal to an axial coordinate of the leading edge of the first blade, the axis being positively oriented in a direction of the flow of the gases in the turbine engine, and
   the axial coordinate of the mid-chord point being less than or equal to a sum of the blade chord and the axial coordinate of the leading edge of the first blade.

6. The stator part according to claim 1, wherein the first blade comprises a leading edge and a trailing edge separated by a blade chord,
   the fin comprising a plurality of profiles stacked in a radial direction between a root profile located at a fin root on the platform and a tip profile located at a fin tip,
   each profile defining a fin chord between the leading edge of the fin and the trailing edge of the fin,
   each profile defining a camber line,
   a ratio of a fin chord of the root profile to the blade chord being greater than or equal to 0.1 and less than or equal to 0.4,
   a first oriented angle being defined between the axis and a first tangent to the fin camber line of the root profile, the first oriented angle being oriented from the axis to the first tangent, the first tangent being tangent to the fin camber line of the root profile at the leading point,
   a second oriented angle being defined between the axis and a second tangent to a blade camber line of a blade root profile of the first blade, the blade root profile being located on the platform, the first oriented angle being oriented from the axis to the second tangent, the second tangent being tangent to the blade camber line at a reference point, the reference point and the leading point having a same axial position with respect to the axis,
   a difference between the first oriented angle and the second oriented angle being less than or equal in absolute value to 10 degrees,
   the fin defining an axial coordinate of a mid-chord point of a fin profile, the mid-chord point being located at equal distance from the leading edge of the fin and from the trailing edge of the fin,
   the axial coordinate of the mid-chord point being greater than or equal to a difference of an axial coordinate of the leading edge of the first blade and one-tenth of the blade chord, the axis being positively oriented in a direction of the flow of the gases in the turbine engine, and the axial coordinate of the mid-chord point being less than or equal to a sum of half the blade chord and the axial coordinate of the leading edge of the first blade.

7. A turbine engine comprising a stator part according to claim 1.

8. An aircraft comprising a turbine engine according to claim 7.

\* \* \* \* \*